Patented Oct. 19, 1948

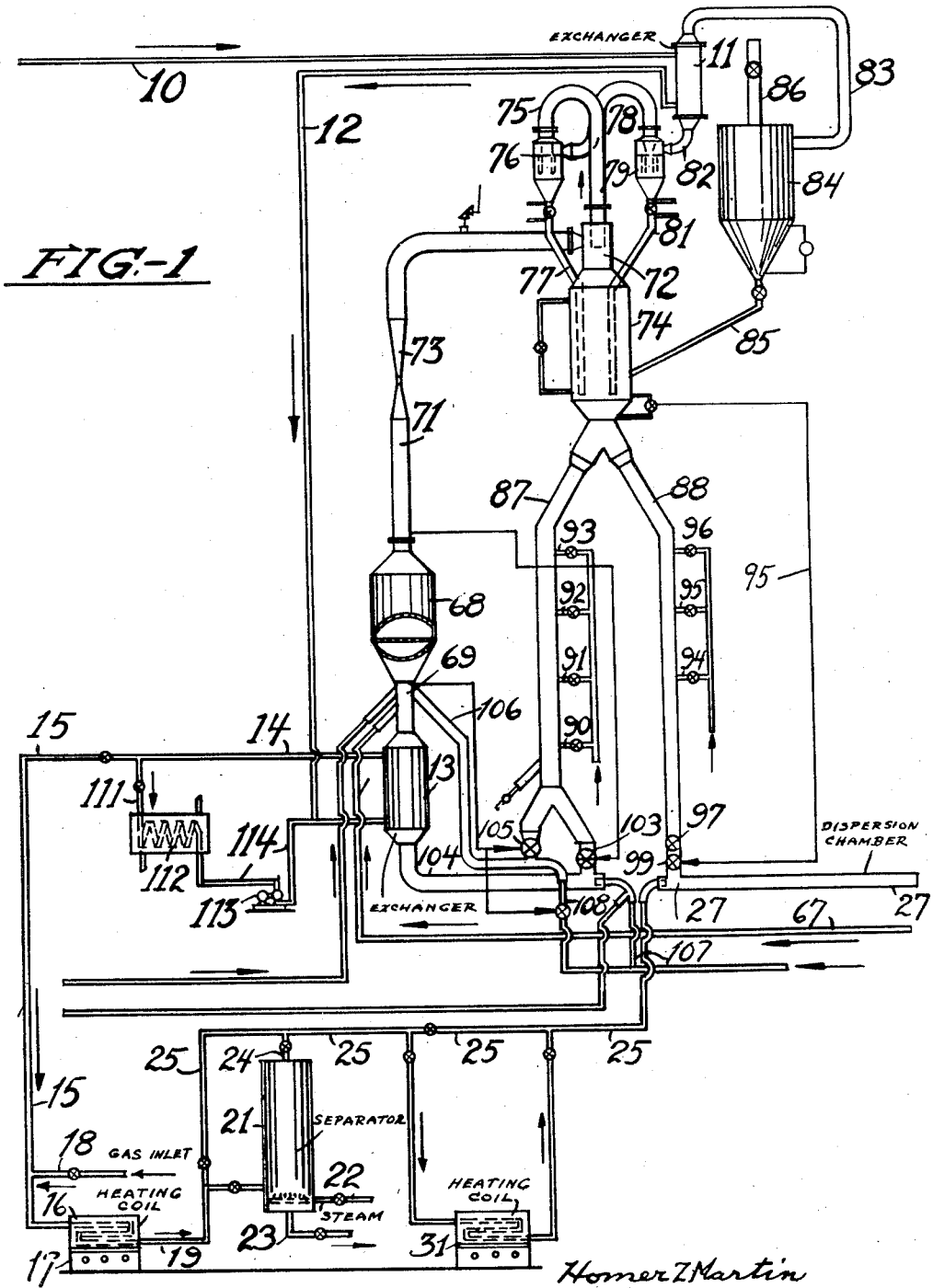

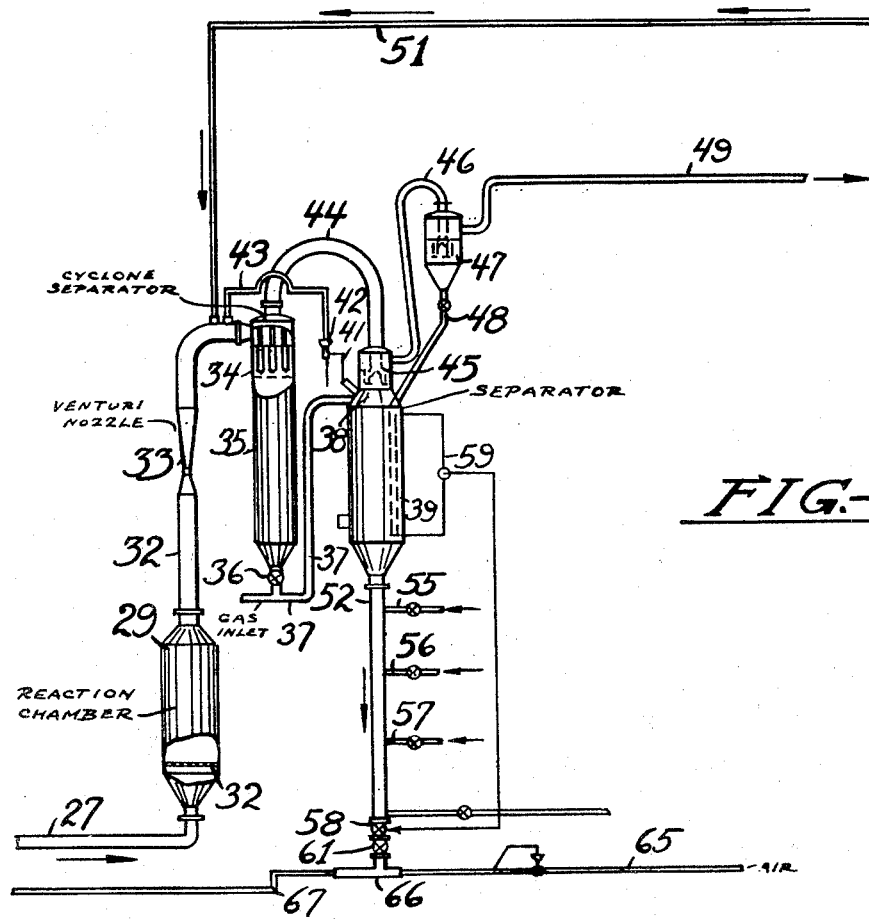

2,451,803

UNITED STATES PATENT OFFICE 2,451,803

METHOD OF CONTACTING SOLIDS AND GASES

Donald L. Campbell, Roselle Park, Homer Z. Martin, Elizabeth, and Charles W. Tyson, Summit, N. J., assignors to Standard Oil Development Company, a corporation of Delaware Application October 5, 1940, Serial No. 359,854

24 Claims. (Cl. 196—52)

This invention relates to a method of and apparatus for contacting solid material in finely-divided form with gaseous products and pertains more particularly to a process and apparatus in which solid material in finely-divided form is intermingled in a gaseous medium and the resulting mixture passed through a treating zone.

The invention finds application in industrial processes of various types wherein finely-divided solids are intermixed with a gaseous or vaporous stream in a continuous manner for the purpose of bringing about physical or chemical changes in the gases or solids, or both.

As examples of processes wherein solids are acted upon by gases in which some phases of the invention may be adapted are: the low temperature carbonization of coal, production of water gas from coal, distillation of wood, oil shale, or coal, treatment of ores, such as reduction and roasting of various metallic ores, drying of solids, and the like.

As examples of non-catalytic processes wherein gases are acted upon by the solids and in which certain phases of the invention find application are: oxidation of gases by various solid oxides, separation and purification of gases by solid adsorbents, such as activated carbon and oxide gels as in air conditioning, recovery of vapors from gases, as in the recovery of solvents from gases in dry cleaning and painting establishments, recovery of gasoline constituents from natural gas, casinghead gas or cracked refinery gas, and the like, separation of gases or vapors by selective adsorption as in selective removal of higher boiling hydrocarbons from lower boiling hydrocarbons.

A third class of processes in which the invention finds application is that in which the finely-divided solid acts as a catalyst for bringing about gas reactions. As examples may be mentioned various organic reactions involving oxidation, reduction, chlorination, hydration, dehydration, and the like, and more particularly various hydrocarbon reactions wherein solid catalysts or treating agents may be employed, such as in cracking, hydrogenation, dehydrogenation, polymerization, alkylation, dealkylation, isomerization, aromatization, desulfurization, synthesis of hydrocarbons from carbon monoxide and hydrogen, and the like.

The invention in its more specific phases is especially directed to processes in which the solid material after passing through the treating zone is separated from the gaseous or vaporous stream and again returned to the treating zone. In particular, it has application to processes in which it is desirable to (1) reactivate or regenerate catalyst powders before returning the same to the treating zone, as in the catalytic conversion of hydrocarbon oils or vapors, or (2) rapidly add or extract heat from the treating zone in which strong exothermic or endothermic reactions are carried out.

The present invention has for its general object the provision for a method of and apparatus for contacting solids with gases, involving mixing finely-divided solids in a gaseous stream and carrying the resulting mixture through a treating zone in a continuous manner which is more simple and economical to construct and operate and which will not be subject to the operating difficulties heretofore experienced in processes of this general nature.

Other more specific objects and advantages of the invention will be made apparent from the more detailed description hereinafter.

The invention in its entirety comprehends a complete unitary process involving reaction and regenerative treatment of the powdered material in a closed circuit and also embraces certain combinations and sub-combinations of process and elements as set forth in the claims hereinafter.

For illustrative purposes the invention will be described with specific reference to the catalytic cracking of petroleum oils in which it has been found to be particularly applicable, it being understood from the above disclosure that the invention in its broader phases will have a more general application.

For a fuller understanding of the invention, reference will now be made to the accompanying drawing, wherein:

Fig. 1 is a diagrammatic view in elevation of a part of the apparatus forming a part of the present invention, and Fig. 1—A is a continuation of Fig. 1 showing the remainder of the apparatus.

Referring to Fig. 1 of the drawing, reference character 10 designates a charge line through which the oil to be cracked is introduced into the system. This oil may be a clean condensate stock such as a gas oil or it may be a residual stock such as topped or reduced crude.

The oil introduced into the system through line 10 is first passed through a heat exchanger 11 wherein the oil passes in heat exchange relation with spent regenerating gases as hereinafter described. The oil from heat exchanger 11 passes through line 12 to a second heat exchanger 13 where it is further heated by heat exchange with powdered catalytic material withdrawn from the regenerating zone later descibed. The oil, after passing through heat exchanger 13, is transferred through lines 14 and 15 to a vaporizing coil 16 located in furnace 17 where it is rapidly heated to a temperature sufficient to vaporize at least a substantial portion of the oil. If desired, steam or other stripping gas may be introduced into the oil through line 18 prior to or during passage through the vaporizing coil 16 to assist in the vaporization of the oil.

Products from the vaporizing coil 16 may pass through transfer line 19 to a separator 21 for separating vapors from unvaporized residue. Additional steam or other stripping agent may be introduced into the separator 21 through line 22. Unvaporized residue segregated in the separator 21 may be removed therefrom through line 23. Vapors liberated in the separator 21 pass overhead through line 24.

In cases where the oil to be treated is a clean condensate stock, the separator 21 may be omitted or the oil from the vaporizing coil 16 may by-pass the separator 21 through line 25.

The vapors liberated in the separator 21 constitute the charging stock to the catalytic cracking unit. These vapors may be passed through lines 24 and 25 to a conduit 27 wherein the vapors intermix with powdered catalytic material introduced into the conduit as later described. The resulting dispersion of oil vapors and powdered material passes through the conduit 27 to a cracking vessel 29. (See Fig. 1—A.)

In some cases it is desirable to further heat the oil vapors from the separator 21. In such case vapors from line 24 may be passed through a superheating coil 31 or other heating device for imparting the desired heat to the vapors.

The amount of catalyst introduced into the oil vapors passing to the reaction chamber 29 may vary over an extended range depending upon a number of factors, such as the characteristics of the oil to be cracked, the activity of the catalyst, and the amount of conversion desired. In general, the amount of catalyst so introduced may be between the limits of from .5 to 20 parts of catalyst per part of oil by weight.

The bottom section of the reaction chamber may be provided with a perforated plate 32 through which the dispersion passes. The purpose of the plate is to distribute the dispersion uniformly through the full cross-sectional area of the cracking vessel.

The cracking vessel is preferably made of such dimensions that the desired conversion is obtained at relatively low velocities, such as from .5 to 10 feet per second. Because of the relatively low velocities at which the gases flow through the circuit, the powder tends to settle out of the gas. As a result there is a considerable slippage between the solid particles and the vapors so that continuous intermixing of the gas and solids is attained. As a result, the time of residence of the solid particles within the cracking zone in such case is materially greater than the time of residence of the oil vapors. For example, whereas the time of residence of the oil vapors may be of the order of from 5 to 50 seconds, the time of residence of the solid particles within the cracking zone may be of the order of from 20 seconds to an hour or more. As a result, a smaller and more compact reactor may be used or the amount of powdered material necessary to be circulated is reduced for a cracking unit of given capacity.

The velocity of the oil vapors passing through the cracking zone, however, is preferably sufficient to prevent complete settling of the powder so that the cracked vapors may be utilized for removing the powdered material from the cracking zone.

The suspension of oil vapors and catalyst, after passing through the cracking vessel, is removed therefrom through line 32 having a Venturi nozzle 33 and is passed to a primary cyclone separator 34 wherein the bulk of the powder is removed from the oil vapors. The catalyst separated in the primary cyclone separator 34 is discharged into the bottom section 35 which is preferably of sufficient size to provide a reserve supply sufficient to last from 5 to 15 minutes. The catalyst discharges from hopper 35 through a suitable valve 36 into a stream of stripping gas such as steam passing through line 37 to a cyclone separator 38 forming the upper section of a second catalyst hopper 39. The steam separated in the separator 38 is withdrawn therefrom through line 41 and is passed by means of steam injector 42 to the inlet side of the primary cyclone separator 34 through line 43.

The reintroduction of the catalyst into a stream of steam in line 37 is primarily for the purpose of removing any volatile oil constituents which may be retained within the catalyst after the separation. In lieu of steam other inert gas such as nitrogen, carbon dioxide, spent combustion gases and the like may be used.

Vapors separated in the primary cyclone separator 34, having the bulk of the powdered material removed therefrom, pass through line 44 to a secondary cyclone separator 45 wherein the vapors are subjected to further purification. The secondary cyclone separator 45 may be conveniently built into the upper section of the catalyst hopper 39. Catalyst separated in the secondary cyclone separator 45 may then charge directly into the catalyst hopper 39. Cracked vapors from the secondary cyclone separator 45 are passed through line 46 to a tertiary cyclone separator 47 wherein further removal of powdered material from the cracked products is obtained. The catalyst separated in the tertiary cyclone separator 47 discharges through line 48 having the end thereof terminating in the bottom section of the catalyst hopper 39 at a point below the level of catalyst maintained therein. Cracked vapors are removed from the tertiary cyclone separator 47 through line 49 and passed to a suitable fractionating or rectifying system (not shown) for segregation of the desired motor fuel products from insufficiently cracked constituents and from normally gaseous constituents. The fractionating or rectifying system may be of any conventional design and in the interest of simplicity has not been shown in the drawing.

While we have shown a series of three cyclone separators operating in series for separating the powdered catalyst from the vapors, it will be understood that other equivalent devices for effecting separation of solids from gases may be used if desired.

In cases where the catalyst is not completely removed from the oil vapors prior to passing the same to the fractionating tower, a narrow fraction of the initial condensate formed in the fractionating tower containing the residual catalyst may be segregated from the remainder by means of a trap-out tray or the like and recycled through line 51 to the inlet side of the primary cyclone separator 34.

Catalyst collected in the hopper 39 discharges into a vertical standpipe 52 of sufficient height to feed the catalyst into a stream of regenerating gas under a pressure at least sufficient to overcome the pressure drop through the regenerating circuit.

One of the important phases of the present invention is the provision of a column of catalyst of a height sufficient to produce a bottom pressure which will feed the catalyst into the stream of regenerating gas.

It has been found that under properly controlled conditions the powered material can be made to flow as a fluid and to conform with many of the physical laws thereof. In order to insure the material flowing as a fluid, it is necessary to prevent the powdered material from packing in the standpipe 52. This can be readily accomplished by the introduction of a small amount of a fluidizing gas at one or more spaced points along the standpipe through lines 55, 56 and 57.

The fluidizing gas introduced through lines 55, 56 or 57 is preferably an inert gas such as steam, carbon dioxide, spent combustion gas, nitrogen or the like.

The lower end of the standpipe 52 is provided with a suitable valve 58 for regulating the amount of catalyst discharging therefrom. A conventional slide valve which can be adjusted to regulate the size of the orifice through which the powder passes is suitable for this purpose, although other types of valves may be used. This valve may be operated manually or automatically, such as by the level in the hopper 39. In the drawing the valve is shown diagrammatically as being controlled through instrument 59 by the level in hopper 39.

As a safety precaution to prevent the possibility of regenerating gas passing upwardly through the standpipe and intermixing with oil vapors, a second safety valve 61 is preferably provided. This valve may be operated automatically to close when the level of powder in the hopper 39 drops below a predetermined point or it may be designed to close automatically when the pressure below the valve 58 approaches or equals the pressure above the valve 58.

The spent catalyst segregated from the cracked products is fed into a stream of regenerating gas which may be air or air diluted with a suitable inert gas, such as steam, carbon dioxide, nitrogen, or the like, introduced into the system through line 65. Regenerating gas is placed under sufficient pressure by means of a blower or other similar device (not shown) for forcing the stream of regenerating gas and catalyst through the regenerating circuit. A suspension of regenerating gas and catalyst to be regenerated is formed in conduit 66 and passed through line 67 to a regenerating chamber 68 (see Fig. 1) which is preferably of a construction similar to the cracking chamber 29.

The regenerating chamber 68 is also preferably of such dimensions that the flow of suspension through the chamber is relatively slow so that considerable slippage occurs between the powder and the gases. The velocity of the gases, however, is greater than the average rate of settling so that the gases may be used to carry the catalyst through the regenerating system. Consequently, as in the cracking chamber 29 the resident time of the catalyst in the regenerating zone is materially greater than the resident time of the regenerating gas therein. The suspension of powdered catalyst and regenerating gas upon being introduced into the regenerating chamber 68 is admixed with cooled regenerated catalyst introduced through conduit 69 as later described. The amount of regenerated catalyst introduced into the regenerating chamber is regulated to control the temperature in the regenerating chamber below a value which would permanently impair the activity of the catalyst. The catalyst, during its passage through the regenerating chamber, is subjected to oxidation reaction to burn off carbonaceous deposits formed thereon during the cracking operation. The suspension of regenerated catalyst and gas, after passing through the regenerating chamber 68, is conducted through line 71 to a primary cyclone separator 72 in which the bulk of the regenerated catalyst is segregated from the regenerating gas.

The density of the stream passing through line 71 may be measured by the pressure drop through a Venturi nozzle 73 located therein and this measurement may be utilized for regulating the flow through the regenerator 68.

The regenerated catalyst separated in the primary cyclone separator 72 may discharge directly into a catalyst hopper 74. To this end the cyclone separator 72 may be built into the upper section of the catalyst hopper as illustrated. The regenerating gas is removed from the primary separator 72 through line 75 and is passed to a secondary cyclone separator 76 wherein further removal of the catalyst from the regenerating gas is obtained. Catalyst separated in the secondary cyclone separator 76 discharges through line 77 having the lower end thereof submerged below the level of catalyst maintained in the catalyst hopper 74.

Regenerating gases from the secondary cyclone separator 76 pass through line 78 into a tertiary cyclone separator 79 wherein further removal of regenerated catalyst from the gas is obtained.

Catalyst separated in the tertiary cyclone separator 79 is discharged through line 81 into the catalyst hopper 74 at a point below the level of the catalyst maintained therein. By submerging the ends of the catalyst discharge lines 77 and 81 below the level of the catalyst in the hopper 74, a seal is maintained preventing gas from the catalyst hopper passing in a reverse direction through the secondary and tertiary cyclones.

The regenerating gas from the tertiary cyclone separator 79 is passed through line 82 to heat exchanger 11 wherein it passes in heat exchange relation with fresh oil to be cracked as previously described. The advantage of the heat exchanger 11 is not only to preheat the oil but to cool the regenerating gases to a point where they may be passed to an electrical precipitator for complete removal of the powdered material. For example, the regenerating gas during passage through heat exchanger 11 may be cooled from a temperature of 1000° down to 700° before passing to the electrical precipitator.

Regenerating gas, after passing through the heat exchanger 11, is transferred through line 83 to an electrical precipitator 84 for further purification of the gas prior to releasing the same to the atmosphere. This electrical precipitator may be of any conventional construction. Catalyst precipitated in the electrical precipitator 84 discharges through line 85 into the catalyst hopper 74 at a point below the level of the material therein. The regenerating gas, after having been substantially purified by means of the cyclone separators and electrical precipitators, is rejected from the system through line 86. This gas may, if desired, be passed to a suitable waste heat boiler or other heat recovery system for removal of heat before being released to the atmosphere.

The regenerated catalyst collected in the hopper 74 discharges continuously into a pair of standpipes 87 and 88. The standpipe 88 should have a height sufficient to produce a pressure at the bottom thereof sufficient to feed the catalyst into the stream of oil vapors to be cracked which in turn must be at least sufficient to overcome the pressure drop through the cracking equipment.

The standpipe 87 should also be of a height sufficient to develop a pressure at the bottom adequate to return the catalyst to the regenerating zone.

In order for the standpipes to be effective for developing pressure, it is important that the catalyst maintained therein be in a freely flowing state therein. To this end, a fluidizing gas may be introduced at one or more spaced points in standpipes 87 and 88 through lines 90 to 93, inclusive, and 94 to 96, inclusive, respectively.

The catalyst maintained in the standpipe 88 is adapted to be returned to the cracking circuit. To this end the bottom of the standpipe 88 may be provided with valve 97 for regulating the flow of catalyst into the stream of oil vapors in conduit 27.

The valve 97 may be regulated manually but is preferably controlled to maintain the desired catalyst-oil ratio as measured by the Venturi nozzle 33.

Also, as shown, a second or safety valve 99 may be placed at the bottom of the standpipe 88 to prevent the possibility of oil vapors from line 27 passing through standpipe 88 and intermingling with regenerating gas. To this end the valve 99 may be made to close automatically when the level in standpipe 88 or hopper 74 drops below a predetermined point or when the difference in pressure between opposite sides of the valve 97 reaches a specified minimum.

Catalyst collected in the standpipe 87 is adapted to be returned to the regenerating chamber for regulating the temperature therein.

To this end, a portion of the catalyst collected in the standpipe 87 may be passed through valve 103 and line 104 to the cooler 13 where it passes in heat exchange with fresh oil to be distilled and cracked and thence back to regenerating zone 68. If desired, a portion of the catalyst returned to the regenerating zone may by-pass the cooler 13 through valve 105 and line 106. If desired, air or other regenerating gas may be introduced through line 107 into the stream of regenerated catalyst being circulated through cooler 13 or through line 108 into the line 106 by-passing the cooler or both to serve as a carrier for the catalyst being returned.

By regulating the relative amounts of cooled regenerated catalyst and uncooled regenerated catalyst returned to the regenerating chamber through lines 104 and 106, respectively, a careful control of temperature within the regenerating chamber may be obtained.

In many cases the amount of heat which must be removed from the catalyst during regeneration is in excess of that required to preheat the oil feed to the desired temperature. Furthermore, it is desirable from a practical standpoint to feed the oil to the vaporizing coil 16 at a uniform temperature regardless of the amount of heat liberated in the regenerating zone.

As shown in the drawing, a part of the oil, after passing through the heat exchanger 13, may be passed through line 111 to a waste heat boiler 112 wherein the oil may be cooled and steam generated. The oil, after passing through the waste heat boiler 112, may be returned to the inlet side of the heat exchanger 13 by means of pump 113 and line 114.

By regulating the amount of oil passing through the waste heat boiler 112 a uniform temperature of feed passing to the vaporizing coil 16 may be maintained without affecting the amount of cooling carried out in the catalyst cooler 13.

From the above description it will be apparent that all of the pressure necessary for introducing the catalyst into the stream of reaction gases and regenerating gases is obtained from vertical columns of catalyst rather than by the use of mechanical devices.

For better understanding of the invention, the following examples may be of help, it being understood that the values and conditions given therein are illustrative rather than limitive.

Reduced crude to be treated introduced into the system through line 10 may be preheated in the heat exchanger 11 from an initial temperature of 400° to 450° F. to a temperature of from 450° to 500° F. and in the catalyst cooler 13 to a temperature of from 650° to 750° F., usually 700° F., prior to passing to the vaporizer 16. The oil during its passage through the vaporizing coil 16 is heated to a temperature of from 800° to 900° F., usually 850° F. The oil then passes from vaporizer coil 16 to the separator where from 60 to 95% passes overhead as vapors. The vapors from the separator pass through a superheater where they are further heated to a temperature of from 850° to 950° F., preferably 900° F.

The amount of pressure imposed upon the oil vapors should be sufficient to overcome the resistance through the cracking circuit and the fractionating system. In cracking apparatus of commercial size employing the type of reactor previously described, a pressure of an atmosphere gauge is ordinarily sufficient.

The catalyst introduced into the stream of oil vapors may be any active cracking calalyst, such as naturally active or activated clays and particularly acid treated clays, or it may be synthetic gels or other adsorptive catalysts of the same or different chemical composition, such as synthetic silica-alumina gels, silica-magnesia gels, and mixtures thereof.

The amount of catalyst introduced into the oil vapors may range from 0.1 to 20 parts of catalyst per part of oil by weight. When employing acid treated bentonitic clays, the ratio may be 4 parts catalyst per part of oil. The temperature of the catalyst introduced into the oil stream is preferably substantially the final regenerating temperature which may be in the order of 1000° to 1100° F. so that the resulting equilibrium temperature of the catalyst and oil vapors may be between 900° F. and 1000° F.

The height of the standpipe 88 from which the catalyst is fed into the oil stream should be sufficient to develop a head of pressure adequate to feed the catalyst into the stream of oil vapors. In a specific instance where activated clay is employed as a catalyst and when the column is properly fluidized by addition of fluidizing gas along the standpipe, from 4 to 6 feet of fluidized catalyst are required for each pound of pressure. In the specific case wherein the oil vapors are under a pressure of one atmosphere gauge and where the pressure at the top of the standpipe 88 is of the order of 3 pounds per square inch, the minimum height of the standpipe will be of the order of 50 feet and is preferably 100 feet or more. In order to insure proper control of the catalyst feed into the oil stream, it is necessary to maintain a pressure differential across the control valves of from 2 to 5 pounds per square inch.

The velocity of the oil stream passing through the cracking zone 29 is preferably below 8 feet per second and may, for example, be of the order of about 2 feet per second. When these low velocities are maintained, the concentration of catalyst within the reaction zone is materially greater than the concentration of catalyst in the stream passing to the reaction zone. For example, when the velocity of oil vapors of 2 feet per second is employed, the concentration of catalyst within the cracking zone may build up to 10 pounds per cubic foot of reaction space. Under such circumstances the resident time the catalyst is retained in the reaction zone may be about 3 minutes, whereas the resident time of the oil vapors will be in the order of 10 seconds.

The cracked vapors and spent catalyst pass to the primary cyclone separator at a temperature of from 850° to 950° F. The pressure drop from the point where the catalyst is introduced into the oil vapors through the cracking chamber up to the primary cyclone where the catalyst is separated may be of the order of 5 pounds per square inch. In such case the oil vapors passing to the fractioning tower will be under a positive pressure of about 10 pounds per square inch. As a result, no additional pressure need be imposed to accomplish the subsequent fractionation and stabilizing treatment.

The height of the standpipe 52 which feeds the catalyst into the regenerating gas should be sufficient to produce a head of pressure at the bottom which will feed the spent catalyst into a stream of regenerating gas which in turn must be under sufficient pressure to carry the mixture through the regenerating circuit. This pressure may, for example, be of the order of 12 to 15 pounds per square inch gauge. In such case, when the back pressure on the hopper 39 is of the order of 10 pounds per square inch gauge, the height of the standpipe 52 may be of the order of from 30 to 60 feet to insure a proper differential across the control valves.

The catalyst and regenerating gas passing to the regenerating chamber 68 are commingled with cooled regenerated catalyst recycled through standpipe 87 and cooler 13 in such proportions that the equilibrium temperature of the mixture introduced into the regenerator is of the order of 900° F. The temperature, however, will be controlled by the amount of catalyst being recirculated through the cooler and the amount by-passing the cooler to prevent the temperature with the regenerator from exceeding a point which would permanently impair the activity of the catalyst. In the case of activated clays previously mentioned, the maximum permissible temperature in the regenerating zone may be of the order of 1050° F.

The velocity of regenerating gas passing through the regenerating zone may be substantially the same as that of the oil vapors passing through the cracking zone, such as from 1 to 8 feet per second. Under such conditions the resident time of catalyst in the regenerating zone may be from one minute to 5 minutes and the resident time of the regenerating gas in the regenerating zone may be from 2 to 60 seconds.

The suspension of regenerated catalyst and regenerating gas is separated in the cyclone separators and electrical precipitators at a temperature approximating the temperature obtained during regeneration, which may be of the order of 1000° to 1100° F. as previously described.

The height of the standpipe 87 for returning catalyst through cooler 13 and back into the stream of unregenerated catalyst passing to the regenerator should be sufficient to overcome the pressure drop through the cooler, regenerating chamber and connecting conduits.

It may be helpful to mention at this point that the circulation of the powder from the point of highest elevation back to the same point is made possible by the fact that the density of the upflowing stream is lower than in the downflowing stream. The pressure developed in the standpipes and superimposed hoppers may be expressed by the formula $DP = dh$, where $DP$ is the differential pressure, $d$ is the density of the material and $h$ the distance from top to bottom.

In order for the powder to circulate in the system, $d_1 h_1$ must be greater than $d_2 h_2$, where $d_1 h_1$ is the density and height of material in the downflowing stream in the standpipes and $d_2 h_2$ the density and height of material in the upflowing stream passing through the reactor or regenerator and connecting pipes. The density of the upflowing stream is maintained below the density of the material in the standpipes by introducing the reaction or regenerating gas into the upflowing stream.

In order for the powdered material to seek its own level and otherwise behave as a liquid, the solid must be in finely-divided form and each particle should preferably be surrounded by a film of gas. Particle sizes smaller than 200 mesh are usually preferred.

While the invention has been described as applied to the catalytic cracking of hydrocarbon oils, in which process it finds particular application, the same general procedural steps apply to other types of hydrocarbon reactions with or without the presence of extraneous gas, such as hydrogen, although the specific operating conditions will usually vary from that just described.

For example, in the reforming of gasoline to improve octane number, the catalyst may be a carrier, such as alumina or magnesia, preferably in adsorptive form containing oxides or sulfides of the metals of group III to VIII, preferably the metals of group VI. The temperature may range from 900° to 1400° F. and the contact time from 2 to 60 seconds. The pressures employed may range from atmospheric to 400 pounds per square inch.

With respect to pressure, it will be understood that the system may be operated under any desired pressure since the standpipes are employed to produce enough pressure to overcome the pressure drop in the system.

In case hydrogen is employed in reforming, some provision is necessary for recycling excess hydrogen.

When the process is utilized for dehydrogenating gases, the same general type of catalyst as employed in reforming may be used. The temperature may be somewhat higher, such as from 700° to 1400° F. and the pressure may be somewhat lower and may range from subatmospheric pressure to 200 pounds per square inch.

In the alkylation of olefins with branched chain paraffins, active alkylating catalysts may be employed. One particularly suitable catalyst is a complex sodium-aluminum chloride. The pressure may be of the order of 500 to 3000 pounds per square inch.

In hydrocarbon processes involving isomerization of straight chain to branched chain paraffins, sodium aluminum chloride may be used as a catalyst or anhydrous aluminum chloride or boron fluoride supported on adsorptive carriers, such as activated charcoal, natural or activated clays, synthetic gels, or the like. The temperature may be of the order of 200° to 300° F. and the pressure from atmospheric to 300 pounds per square inch.

For isomerizing olefins, activated clays, bauxite, and activated aluminas may be employed as catalysts and the temperature may be from 575° to 1000° F.

In catalytic refining of hydrocarbons to remove gum-forming constituents, sulfur and other impurities, activated alumina, alumina gels, naturally active or activated clays with or without the presence of other metal oxides may be used as a catalyst. In such processes, the temperature is below active cracking temperature, such as from 400° to 800° F.

For reactions involving hydrogenation, pressures upwards of 300 pounds per square inch should be employed. Temperatures upwards of 700° F. may be employed with a catalyst consisting of finely-divided nickel, tungsten, molybdenum, or the oxides and sulfides thereof. Also other known hydrogenating catalysts may be employed.

For example, in some variations of the catalytic cracking process or in some other processes using the above invention, the amount of heat liberated in regeneration may be relatively small and the range of desirable operating temperature from inlet to outlet may be relatively large so that it is feasible to cool the stream of fluidized spent catalyst prior to its induction into the regenerator and omit the recycling of regenerated catalyst from the standpipe containing regenerated catalyst to the regenerator.

In some cases it may even be desirable to heat the regenerated catalyst recycled to the reactor rather than to cool.

Also, in some processes using the above invention, the amount of heat absorbed in the treating step may be relatively large and the range of desirable operating temperature from inlet to outlet may be relatively small so that it is desirable to add to the apparatus above described equipment, not shown, to permit recycling catalyst from the spent catalyst standpipe through indirect heat exchange equipment or other means (to put heat into the stream) back into the reactor.

While we have shown the step of stripping the catalyst recovered in the primary cyclone 34, in many cases this step may be omitted.

For lack of a better name, the term "fluistatic" as employed in the claims is intended to be synonymous with "hydrostatic," except that it is not limited to liquids but applies also to finely-divided solids which in fluidized state behave in many respects as a liquid.

Having described the preferred embodiment of the invention, it is understood that it embraces such other variations and modifications as come within the spirit and scope thereof.

What is desired to be protected by Letters Patent is:

1. A process for contacting solids and gases which comprises passing a confined stream of said gases through an extended path including a treating zone, imposing an initial positive pressure on the stream of gases at least sufficient to overcome the resistance of said path to the flow of said gases under obtaining conditions, introducing the solids to be contacted in finely-divided state into said stream of gases prior to removal of said gases from the treating zone, maintaining a column of downwardly flowing solids above the point of entry of said solids into said gases, introducing gas into said column in an amount controlled to maintain a pseudo-liquid mixture of gas and solid throughout substantially the entire length of said column capable of generating a fluistatic pressure at the base thereof, maintaining said column at a height such that the fluistatic pressure developed at the base of said column is greater than the pressure on said gases at the place of entry of said solids therein, and discharging solids from said column into said gases while under fluistatic pressure generated by said column.

2. In the process defined by claim 1, the further improvement which comprises introducing a gaseous fluidizing agent at spaced points along said column in an amount sufficient to maintain said solids within said column in a freely flowing state throughout the full length thereof.

3. A process for contacting solids and gases which comprises passing a confined stream of gases through an extended path including a treating zone, imposing an initial positive pressure on the stream of gases at least sufficient to overcome the drop in pressure on said gases during passage through said extended path under obtaining conditions, introducing the solids to be contacted in finely-divided state into said stream of gases prior to removal of said gases from said treating zone and while said gases are at a positive pressure, maintaining a vertical column of downwardly flowing solids above the point of entry of said solids into said gases, passing gas lengthwise of said column in an amount controlled to maintain the solids in said column in a pseudo-liquid state throughout substantially the entire length to thereby develop a fluistatic pressure at the base thereof, maintaining said column at a height such that the fluistatic pressure so developed is greater than the pressure on the gases at the place of entry of said solids into said gases, discharging solids at a controlled rate from said column into said gases, subsequently separating solids from said gases, and passing the solids so separated to the top of said column for return to said stream of gases.

4. In a process for contacting gases and finely-divided solids wherein said solids are circulated in a closed circuit including a treating zone in which the solids are contacted with a gaseous agent to be treated and wherein there is a substantial drop in pressure on the solid material passing through said circuit due to the resistance of said circuit to the flow of said solids; the method of restoring pressure on the circulating solids which comprises maintaining a downwardly flowing column of said solids within said circuit, introducing a gas into said column in an amount controlled to maintain a pseudo-liquid mixture of gas and solids throughout substantially the entire length of said column capable of generating a fluistatic pressure at the base thereof, maintaining said column at a height such that the fluistatic pressure developed by said column is sufficient to restore at least a substantial portion of the pressure lost during circulation of said solids.

5. In a process for the conversion of hydrocarbons wherein the hydrocarbons to be converted are passed in gaseous form through a conversion zone containing a body of finely-divided, solid contact material and wherein the conversion zone is maintained under a substantial positive pressure; the method of building up a positive pressure on said finely-divided contact material to introduce said material into said conversion zone which comprises maintaining a vertical column of said contact material external to said conversion zone, passing gas lengthwise of said column in an amount controlled to maintain the column in a pseudo-liquid state throughout substantially the entire length, capable of generating a fluistatic pressure at the base thereof, maintaining said column at a height such that the fluistatic pressure so developed is greater than the pressure on said gaseous hydrocarbons passing through said conversion zone, discharging solids at a controlled rate from said column into said stream of hydrocarbons to be converted, and adding additional solids to the top of said column to replace solid contact material discharged from said column into said hydrocarbons.

6. In a process for the catalytic conversion of hydrocarbon oils wherein a catalyst in finely-divided form is continuously circulated in a closed circuit through a conversion zone in which it is contacted with hydrocarbons to be converted and wherein there is a material drop in pressure on the catalyst during passage through said circuit due to the resistance of said circuit to the flow of said catalyst; the method of restoring pressure on the circulating catalyst which comprises maintaining a downwardly flowing column of said catalytic material within said circuit, passing gas lengthwise of said column in an amount controlled to maintain the column in a pseudo-liquid state substantially throughout the entire length, capable of generating a fluistatic pressure at the base thereof, maintaining said column at a height such that the fluistatic pressure developed at the base is sufficient to restore at least a substantial portion of the pressure lost during circulation of said catalyst through said circuit.

7. In a process for the catalytic conversion of hydrocarbon oils wherein a conversion catalyst in finely-divided form is maintained in contact with the oil to be converted for a predetermined period, the catalytic material then separated from the conversion products, the catalytic material so separated passed through a regenerating zone and thereafter recombined with the hydrocarbon oil to be converted and wherein there is a material drop in pressure on the catalytic material during passage through the conversion and regenerating zones; the method of restoring pressure on said catalytic material being circulated through said zones which comprises maintaining a vertical column of said finely-divided catalytic material being circulated through said conversion and regenerating zones, keeping a gaseous fluidizing medium in admixture with said catalytic material throughout the full length of said column, the amount of said gaseous fluidizing medium being sufficient to maintain said catalytic material in a freely flowing state during its passage through said column to thereby develop a fluistatic pressure at the base of said column and discharging catalytic material from said column into a gaseous stream passing through one of said zones in a region of elevated pressure, the height of said column being such as to develop a fluistatic pressure on said catalytic material greater than the pressure on the gaseous stream at the place of entry of said catalytic material into said stream.

8. A process for cracking hydrocarbon oils in the presence of a finely-divided solid contact material wherein a stream of oil to be cracked is passed through an extended path including a cracking zone and a subsequent fractionating zone in which the cracked products are fractionated to segregate a motor fuel and wherein an initial positive pressure is imposed on the oil stream to be cracked at least sufficient to overcome the drop in pressure on said oil during passage through said extended path; the method of building up a positive pressure on the finely-divided contact material to thereby feed said material into said oil stream which comprises maintaining a column of said finely-divided contact material in admixture with a gaseous fluidizing agent, the amount of said gaseous fluidizing agent within said column being sufficient to maintain said contact material in freely flowing state throughout the full length of said column to thereby develop a fluistatic pressure at the base thereof, maintaining said column at a height such that the fluistatic pressure so developed is sufficient to feed said solid contact material from said column into said oil stream while said oil stream is at a positive pressure, discharging the solid contact material from said column into said oil stream before the removal of the oil stream from said cracking zone, regulating the amount of contact material so discharged to obtain the desired concentration of oil vapors and contact material and adding additional contact material to said column to replace that discharged into said oil stream.

9. In the process defined by claim 8, the further improvement which comprises employing an active cracking catalyst as the solid contact material.

10. In the process defined by claim 8, the further improvement which comprises employing an active cracking catalyst as the solid contact material admixed with said oil and introducing into said oil stream from 0.5 to 20 parts of catalyst per part of oil.

11. In the process defined by claim 8, the further improvement which comprises employing an acid-treated bentonite clay as the contact material for the cracking process.

12. In the process defined by claim 8, the further improvement which comprises employing a solid contact material having a particle size not greater than 200 mesh.

13. In the process defined by claim 8, the further improvement which comprises continuously separating the solid contact material from the cracked products, regenerating the contact material so separated to remove carbonaceous deposits formed during the cracking operation and thereafter returning the regenerated contact material to the top of said column.

14. In a process for the catalytic conversion of hydrocarbons of the type wherein subdivided solid catalytic material is alternately and continuously passed through a conversion zone wherein it acquires an inactivating carbonaceous deposit and a regeneration zone wherein said carbonaceous deposit is removed, said conversion zone and said regeneration zone containing gaseous materials under different pressures, the method of transferring catalytic material between said zones which comprises introducing the particles of solid catalytic material from one of said zones into one end of a manometric column of aerated catalytic particles in a pseudo-liquid condition opposing its pseudo hydrostatic pressure against the pressure of the higher pressure zone and withdrawing particles of catalytic material from the other end of said column into the other of said zones.

15. In a process for the catalytic conversion of hydrocarbons of the type wherein subdivided solid catalytic material is alternately and continuously passed through a conversion zone wherein it acquires an inactivating carbonaceous deposit and a regeneration zone wherein said carbonaceous deposit is removed, said conversion zone and said regeneration zone containing gaseous material under different pressures, the method of transferring catalytic material between said zones which comprises introducing the particles of solid catalytic material from one of said zones into one end of a manometric column of aerated catalytic particles in a pseudo-liquid phase opposing its pseudo-hydrostatic pressure against the pressure of the higher pressure zone and withdrawing particles of catalytic material from the other end of said column into the other of said zones, said column being of a suitable height to prevent the intermingling of the gases contained in said conversion zone and regeneration zones by passage through said column during the transfer of the catalytic particles therethrough.

16. In a process for the catalytic conversion of hydrocarbons wherein particles of solid catalytic material are alternately and continuously passed through a conversion zone wherein they acquire an inactivating carbonaceous deposit and a regeneration zone wherein said carbonaceous deposit is removed, said conversion zone and said regeneration zone containing gaseous materials under different pressures, the method of transferring the particles of catalytic material between said zones which comprises maintaining a vertically extending manometric column of the particles in communication with the zone of higher pressure at its lower end and in communication with the zone of lower pressure at its upper end, introducing an aerating gas into said column of solid particles in amounts adapted to maintain the particles in a pseudo-liquid phase, the height of said column being such that it will exert a pseudo-hydrostatic pressure approximating the difference between the pressures of the two zones, and introducing the particles of solid catalytic material from one of said zones into said column at the end in communication therewith to displace solid material from the other end of said column into the other of said zones.

17. In the process of treating hydrocarbon vapors at elevated temperatures with finely divided, solid catalyst in suspension wherein the suspended catalyst becomes deactivated by the deposition of carbonaceous matter, the deactivated catalyst is separated from the treated vapors, regenerated by contacting with oxidizing gas to remove carbonaceous deposits and is then recycled to the system, the improvement comprising regenerating said catalyst by suspending it in said oxidizing gas under low superatmospheric pressure in a regeneration zone, withdrawing the regenerated catalyst and gas from said regeneration zone, feeding dry, free-flowing, finely divided, deactivated, solid catalyst to said regeneration zone from the base of a column of catalyst of sufficient height to provide the pressure required for said feeding of catalyst in said regeneration zone, and maintaining catalyst in said column in free-flowing condition by injecting aerating gas thereinto.

18. In the process of converting hydrocarbon oils by contacting their vapors at conversion temperature with finely divided solid conversion catalyst in suspension, followed by separation of spent catalyst from converted vapors, regeneration of said spent catalyst by combustion in a regeneration zone and recycling of regenerated catalyst to the conversion step of the process, the improvement comprising forcing said spent catalyst into said regeneration zone by fluistatic pressure from a column of said spent catalyst having the catalyst particles surrounded by thin films of gas to maintain the catalyst column in a pseudo-liquid state.

19. In the process of converting hydrocarbon oils by contacting their vapors at conversion temperature with finely divided solid conversion catalyst in suspension, followed by separation of spent catalyst from converted vapors, regeneration of said spent catalyst by combustion in a regeneration zone and recycling of regenerated catalyst to the conversion step of the process, the improvement which comprises effecting the separation of spent catalyst from converted vapors at a high level, introducing the separated catalyst to the top of an aerated catalyst column of such height that it will develop sufficient "hydrostatic" pressure for the introduction of said catalyst to the regeneration zone and picking up catalyst from the base of said column in a carrier gas at such pressure as to effect the introduction of the catalyst from the base of the column to said regeneration zone.

20. In a catalytic cracking operation wherein vapors of hydrocarbon oil are contacted with a powdered cracking catalyst and the spent catalyst is regenerated by contacting with a hot oxygen-containing gas and recycled while still hot to the system, the improvement which comprises facilitating the continuous feeding of dry, freely flowing, powdered catalyst to the vapor stream by maintaining the catalyst in an elongated vertical column of a height to provide sufficient hydrostatic pressure to force the catalyst into contact with said vapor stream and injecting an aerating gas into said column to maintain said catalyst in a freely flowing state.

21. In a process for contacting gases and finely-divided solids wherein said solids are continuously circulated in a closed circuit including a treating zone in which the solids are contacted with a gaseous agent to be treated and wherein there is a substantial drop in pressure on the solid material passing through said circuit due to the resistance of said circuit to the flow of said solids; the method of restoring pressure on the circulating solids which comprises maintaining a downwardly flowing column of said solids within said circuit, maintaining a gaseous fluidizing agent in admixture with said solids throughout the passage of said solids through said column to keep said solids in a freely flowing fluidized state throughout the full length thereof whereby a fluistatic pressure is transmitted to the base of said column, maintaining said column at a height such that the fluistatic pressure developed by said column is sufficient to restore at least a substantial portion of the pressure lost during circulation of said solids and maintaining a plurality of said columns of freely flowing solid material within said circuit, the combined height of the columns being sufficient to restore all of the pressure lost in circulation.

22. In a process for the catalytic conversion of hydrocarbon oils wherein a catalyst in finely-divided form is continuously circulated in a closed circuit including a conversion zone in which it is contacted with hydrocarbons to be converted and wherein there is a material drop in pressure on the catalyst during passage through said circuit due to the resistance of said circuit to the flow of said catalyst; the method of restoring pressure on the circulating catalyst which comprises maintaining a downwardly flowing column of said catalytic material within said circuit, keeping a gaseous fluidizing agent in admixture with said catalyst throughout the passage of said catalytic material through said column, the amount of said gaseous fluidizing agent being sufficient to maintain said catalytic material in freely flowing state throughout the full length of said column to thereby develop a fluistatic pressure at the base of said column, maintaining said column at a height such that the fluistatic pressure developed at the base is sufficient to restore at least a substantial portion of the pressure lost during circulation of said catalyst through said circuit and maintaining a plurality of said columns of freely flowing catalytic material within said circuit, the combined height of said columns being sufficient to restore all of the pressure lost during circulation.

23. In a process for the catalytic conversion of hydrocarbon oils wherein a conversion catalyst in finely-divided form is maintained in contact with the oil to be converted for a predetermined period, the catalytic material then separated from the conversion products, the catalytic material so separated passed through a regenerating zone and thereafter recombined with the hydrocarbon oil to be converted and wherein there is a material drop in pressure on the catalytic material during passage through the conversion and regenerating zones; the method of restoring pressure on said catalytic material being circulated through said zones which comprises maintaining a vertical column of said finely-divided catalytic material being circulated through said conversion and regenerating zones, keeping a gaseous fluidizing medium in admixture with said catalytic material throughout the full length of said column, the amount of said gaseous fluidizing medium being sufficient to maintain said catalytic material in a freely flowing state during its passage through said column to thereby develop a fluistatic pressure at the base of said column and discharging catalytic material from said column into the circulating stream in a region of elevated pressure, the height of said column being such as to develop a fluistatic pressure on said catalytic material greater than the pressure on the circulating stream at the place of entry of said catalytic material into said stream and maintaining a plurality of said freely flowing columns of catalytic material, the combined height of said columns being sufficient to restore all of the pressure lost during circulation of said catalytic material through said cracking and regenerating zones.

24. In a process of cracking hydrocarbon oil in which vapors of the oil to be cracked are passed through a reaction zone in which they are cracked by contact with heated powdered catalyst, the cracked vapors are separated from the catalyst and the catalyst, including carbon deposited thereon as a result of the cracking reaction is transferred to a regenerating zone where it is heated and regenerated by the action of oxidizing fluids on the catalyst, the steps of continuously transferring heated regenerated powdered catalyst from the regenerating zone to the cracking zone comprising continuously withdrawing said heated regenerated powdered catalyst from the regenerating zone, introducing it into the upper end of a column of catalyst, maintaining the catalyst in a fluidized condition throughout the length of said column by adding fluidizing gas to the column, maintaining a fluistatic pressure of the fluidized catalyst at the lower end of the column in excess of the pressure within the reaction zone, and utilizing said excess of pressure to transfer the heated catalyst from the lower end of the column to the reaction zone at a controlled rate.

DONALD L. CAMPBELL.
HOMER Z. MARTIN.
CHARLES W. TYSON.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,039,904 | Hill | May 5, 1936 |
| 2,231,424 | Huppke | Feb. 11, 1941 |
| 2,264,438 | Gaylor | Dec. 2, 1941 |
| 2,304,827 | Jewell | Dec. 15, 1942 |

FOREIGN PATENTS

| Number | Country | Date |
| --- | --- | --- |
| 23,045/1910 | Great Britain | May 2, 1911 |
| 533,037 | Germany | Sept. 8, 1931 |